US006286556B1

(12) United States Patent
Kato

(10) Patent No.: US 6,286,556 B1
(45) Date of Patent: Sep. 11, 2001

(54) HIGH-PRESSURE FUEL INJECTION PIPE FOR DIESEL ENGINE

(75) Inventor: Nobuo Kato, Sunto-gun (JP)

(73) Assignee: Usui Kokusai Sangyo Kaisha LTD (JP)

( * ) Notice: Subject to any disclaimer, the term of this patent is extended or adjusted under 35 U.S.C. 154(b) by 0 days.

(21) Appl. No.: 09/564,514

(22) Filed: May 4, 2000

(30) Foreign Application Priority Data

May 14, 1999 (JP) ... 11-134370

(51) Int. Cl.[7] ... F16L 9/18

(52) U.S. Cl. ... 138/109; 138/112; 138/114; 285/145.4; 285/302; 285/354

(58) Field of Search ... 138/109, 112, 138/114; 285/145.1, 145.4, 148.2, 31, 302, 354, 386

(56) References Cited

U.S. PATENT DOCUMENTS 4,149,568 * 4/1979 Kuntz et al. ... 138/114
5,011,193 * 4/1991 Porte ... 285/31
5,024,469 * 6/1991 Aitken et al. ... 285/302
5,160,174 * 11/1992 Thompson ... 285/302
5,299,541 * 4/1994 Yamaguchi et al. ... 285/302
6,056,329 * 5/2000 Kitani et al. ... 285/302

* cited by examiner

*Primary Examiner*—James Hook
(74) *Attorney, Agent, or Firm*—Anthony J. Casella; Gerald E. Hespos

(57) ABSTRACT

A high-pressure fuel injection pipe for a diesel engine includes a fuel pipe main body with opposed first and second ends. First and second fastening nuts are mounted over the first and second ends. A first unitary outer pipe is mounted over a portion of the fuel pipe main body and is mounted to the first fastening nut. A second unitary outer pipe is mounted over a portion of the fuel pipe main body and has an end mounted to the second fastening nut. The end of the second outer pipe is spaced from the second fastening nut is expanded circumferentially and telescoped over a portion of the first outer pipe. A sealing ring is sealingly engaged between the first and second outer pipes.

6 Claims, 4 Drawing Sheets

HIGH-PRESSURE FUEL INJECTION PIPE FOR DIESEL ENGINE

BACKGROUND OF THE INVENTION

1. Field of the Invention

This invention relates particularly to a high-pressure fuel injection pipe for a Diesel engine which pipe has a relatively small pipe diameter of not greater than about 30 m/m and is disposed in the proximity of the Diesel engine as a fuel supply path.

2. Description of the Related Art

High-pressure fuel injection pipes for a Diesel engine employ generally the following construction as their principal portions are depicted in FIG. 5, to completely prevent scatter and leak of a fuel outside the engine. Outer pipes 12-1 and 12-2 as discrete bodies are fitted to the outer peripheral side of an injection pipe main body 11 in such a fashion that they can move in an axial direction while their opposed end faces keep a predetermined space 14 between them. An interconnecting cylinder body 13 is so disposed near the mutual end portions of the outer pipes 12-1 and 12-2 as to bridge both outer pipes 12-1 and 12-2. This cylinder body 13 is thermally welded (W-1 and W-2) at both end portions thereof to positions of the inner end portions of the outer pipes 12-1 and 12-2 to define a double wall structure.

In the injection pipe having such a construction, the outer pipes 12-1 and 12-2 must be put and assembled at the predetermined positions of the injection pipe main body 11. Under this state, the interconnecting cylinder body 13 must be then disposed in such a manner as to bridge both outer pipes 12-1 and 12-2. Thereafter, both end portions of the interconnecting cylinder body 13 must be thermally welded (W-1, W-2) to the outer pipes 12-1 and 12-2 by brazing or welding. Consequently, the thermal welding process step is troublesome to conduct. In addition, this heating step invites deterioration of the mechanical strength due to heating of the fuel injection main body 11 positioned near the thermal welding portion, and the drop in the corrosion resistance due to the heat loss of the corrosion-resistant process coating of the outer pipes 12-1 and 12-2.

In other words, the thermal welding process step must be carried out for two positions after the fuel injection pipe is assembled and completed substantially in the form of a product, and a step of repairing the coating such as Zn plating, that is damaged by thermal welding, becomes necessary. On the other hand, the fuel injection pipe main body 11 is produced by repeatedly stretching and heat-treating a mother pipe comprising a steel pipe or a stainless steel pipe. A final stretched pipe is further heat-treated to obtain a crystal grain size and various properties, such as hardness, suitable for the injection pipe. Thermal welding W-1 and W-2 invites embrittlement or changes the structure to an annealed structure due to coarsening of the crystal grain size in the case of the steel pipe, and invites deterioration due to precipitation of Cr—C in the case of the stainless steel pipe. Such deterioration of the mechanical strength and vibration from the engine during the practical use result in the occurrence of cracks in the peripheral wall in the course of the fuel injection pipe for a long time. In consequence, scatter and leak of the fuel in the atomized state outside the engine might occur, and safety measures must be further taken.

To cope with this problem, the applicant of this invention proposed previously a high-pressure fuel injection pipe that can eliminate the troublesome thermal welding step on the peripheral wall surface on the side of the injection pipe main body positioned near the bridging portion of the interconnecting cylinder, the troublesome repairing step of the corrosion-resistant coating and deterioration of the mechanical strength, can prevent the scatter and leak of the fuel to the outside, can insure more reliably the counter-measure against the fire, and can be used for a long period (Japanese Patent Laid-Open No. 5-296121).

This high-pressure fuel injection pipe has the following construction. The fuel injection main body has an assembly of connection head portions formed at both end portions and fastening nuts disposed at the back of the connection head portions, respectively. Outer pipes each comprising a discrete body are put to the outer peripheral side of the fuel injection main body in such a fashion that they can move in an axial direction while keeping a gap between their opposed end faces. The mutual outer end portions of these outer pipes are meshed with the fastening nuts through seal ring members, respectively. A short plate-like interconnecting cylinder body is so disposed near the mutual inner end portions of the outer pipes as to bridge these outer pipes. This high-pressure fuel injection pipe is assembled in the following way. One of the outer pipes, that is positioned on the side of the connection head portion, and the interconnecting cylinder body on the same side as the former are meshed with one of the fastening nuts through one of the fastening nuts that is assembled in advance near the outer end portion of the outer pipe. Under this state, these members are brazed. Next, the other outer pipe, that is similarly meshed with the other fastening nut through the other seal ring member, is fitted from the other end of the injection pipe main body. Thereafter, the other outer pipe and the other fastening nut are moved towards the connection head portion at one end that is already formed. Under this state, the other connection head portion is then formed. Furthermore, the other fastening nut and the other out pipe are returned to the respective normal positions, and then the interconnecting body is fitted to bridge the outer pipes through the seal ring member.

The prior art technology described above employs brazing to connect and fix one of the outer pipes to the interconnecting cylinder body. When this brazing is used for bonding, the troublesome surface treatment must be carried out afterwards to prevent the heat loss of the surface-treatment resulting from brazing. When both ends of the outer pipe are sealed by the sealing member, the seal position is likely to deviate from the normal position because the outer pipes are freely movable in the axial direction.

SUMMARY OF THE INVENTION

The present invention has been made to solve the problems of the prior art technology described above, and provides a high-pressure fuel injection pipe for a Diesel engine that does not at all call for a thermal welding process step such as brazing, which has been employed in the past for fixing the outer pipes to the interconnecting cylinder body, and completely eliminates possible deviation of the outer pipes from the normal positions.

In a high-pressure fuel injection pipe for a Diesel engine of the type wherein outer pipes each comprising a discrete body are fitted to, and superposed with, an outer peripheral side of a fuel pipe main body having an assembly of connection head portions formed at both ends thereof and fastening nuts disposed at the back of the connection head portions, respectively, the portion of the outer pipe near the outer end portion thereof is meshed with the fastening nut through a seal ring member, and a seal ring member is interposed between the peripheral surface of the opposing outer pipe and either one of the end portions of the outer pipes, at which an interconnecting cylinder body bridging the outer pipes in the proximity of mutual inner end portions of the outer pipes fits to the outer pipes, on at least one of the fitting end sides of the interconnecting cylinder body, the fuel injection pipe according to the present invention is characterized in that either one of the outer pipes and the interconnecting cylinder body comprise a unitary pipe, and a seal ring member is interposed between a portion in the proximity of the end portion of the large diameter tube side of the outer pipe having the unitary pipe structure and the outer peripheral surface of the outer pipe opposing the outer pipe having unitary pipe structure.

The method of shaping the outer pipe comprising the unitary pipe having the interconnecting cylinder body portion includes a method comprising expanding one of the end sides of one tubular body having a small diameter and a predetermined length to form a large diameter pipe portion, swelling an open end portion of the large diameter pipe portion and forming a sealing ring fitting recess. Another method comprises contracting one of the end sides of one tubular body having a predetermined length and the same diameter as that of the large diameter pipe portion to form a small diameter pipe portion and the large diameter pipe portion, and swelling an open end portion of the large diameter pipe portion to form a seal ring member fitting recess.

The high-pressure fuel injection pipe for a Diesel engine according to the present invention is produced in the following way. One of the outer pipes, that has in advance the small diameter pipe portion, the large diameter pipe portion, and the seal ring member fitting recess is meshed at the portion thereof near the outer end with one of the fastening units, that is already assembled, on the outer peripheral portion of the injection pipe main body having the connection head portion at the ends thereof, through the seal ring member. Next, the other pipe meshed with the other fastening nut through the seal ring member is fitted similarly from the other end of the injection pipe main body. Thereafter, the connection head portion at the other end of the injection pipe main body is formed while the other outer pipe and the other fastening nut are moved to the connection head portion at one of the ends, that is already formed. Furthermore, the other fastening nut and the outer pipe having the small diameter pipe portion, the large diameter pipe portion and the seal ring member fitting recess are returned to their normal positions. The outer pipe is then fitted and assembled to the portion of the outer diameter pipe portion of the former outer pipe, that is returned to the normal position, through the seal ring member.

Therefore, the present invention does not require thermal welding process step such as brazing, can conduct easily and quickly the assembly work of the injection pipe, can completely eliminate deterioration of the mechanical strength resulting from heating and can completely prevent the scatter and leak of the fuel. Because the outer pipes each comprising a discrete body need not be moved in an axial direction while keeping a gap between the opposing end faces thereof, deviation of the outer pipes from the normal positions can be completely eliminated, and high seal performance can be secured.

DESCRIPTION OF THE PREFERRED EMBODIMENTS

Figure 1:
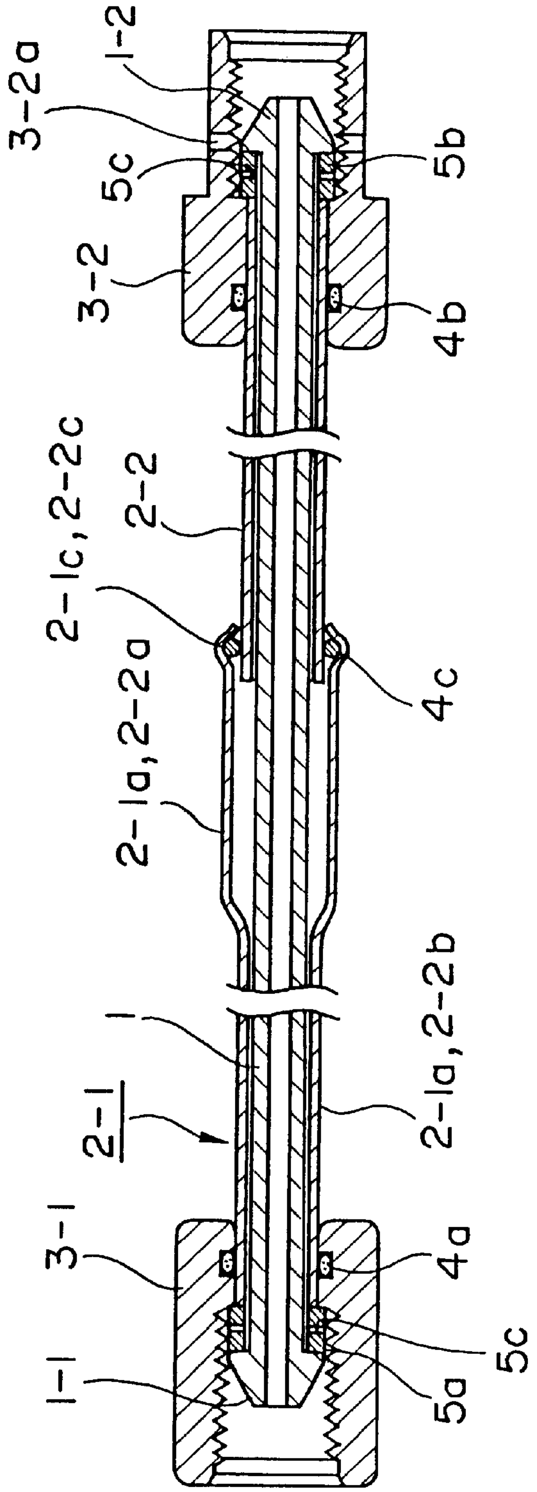
FIG. 1 is a partly omitted, longitudinal sectional view of a high-pressure fuel injection pipe for a Diesel engine according to one embodiment of the present invention.

In the present invention, reference numeral 1 denotes a injection pipe main body. Reference numerals 1-1 and 1-2 denote connection head portions. Reference numerals 2-1, 2-2, 2-11 and 2-12 denote outer pipes. Reference numerals 3-1 and 3-2 denote fastening nuts. Reference numerals 4*a*, 4*b*, and 4*c* denote sealing members, and reference numerals 5*a* and 5*b* denote washers.

In the injection pipe main body 1 of the present invention, the fastening nuts 3-1 and 3-2 are assembled through the washers 5*a* and 5*b*, whenever necessary, at the back of the connection head portions 1-1 and 1-2 formed at both end portions of the main body 1. One 1-1 of the connection head portions 1-1 and 1-2 is formed at one of the ends of the main body 1. The outer pipe 2-1, that is in advance equipped integrally with an interconnecting cylinder portion, of the two outer pipes 2-1 and 2-2 each comprising a discrete body, is superposed with, and fitted to, the outer peripheral side of the injection pipe main body 1 under the state where this outer pipe 2-1 is meshed with one 3-1 of the fastening nuts 3-1 and 3-2, that is already assembled to its outer end portion, through the washer 5 and the seal ring member 4*a*. Next, the other outer pipe 2-2, the end portion of which is meshed with the other fastening unit 3-2 through the seal ring member 4*b*, is similarly superposed with, and fitted to, the outer peripheral side of the injection pipe main body 1 from its other end. The other outer pipe 2-2 and the other fastening nut 3-2 are moved to the side of the connection head portion 1-1 that is already shaped. Under this state, the connection head portion 1-2 at the other end of the injection pipe main body 1 is formed by punching while the pipe main body 1 is held by a chuck. Thereafter, the other fastening nut 3-2 and the outer pipe 2-2 are returned to their normal positions, respectively.

Figure 2:
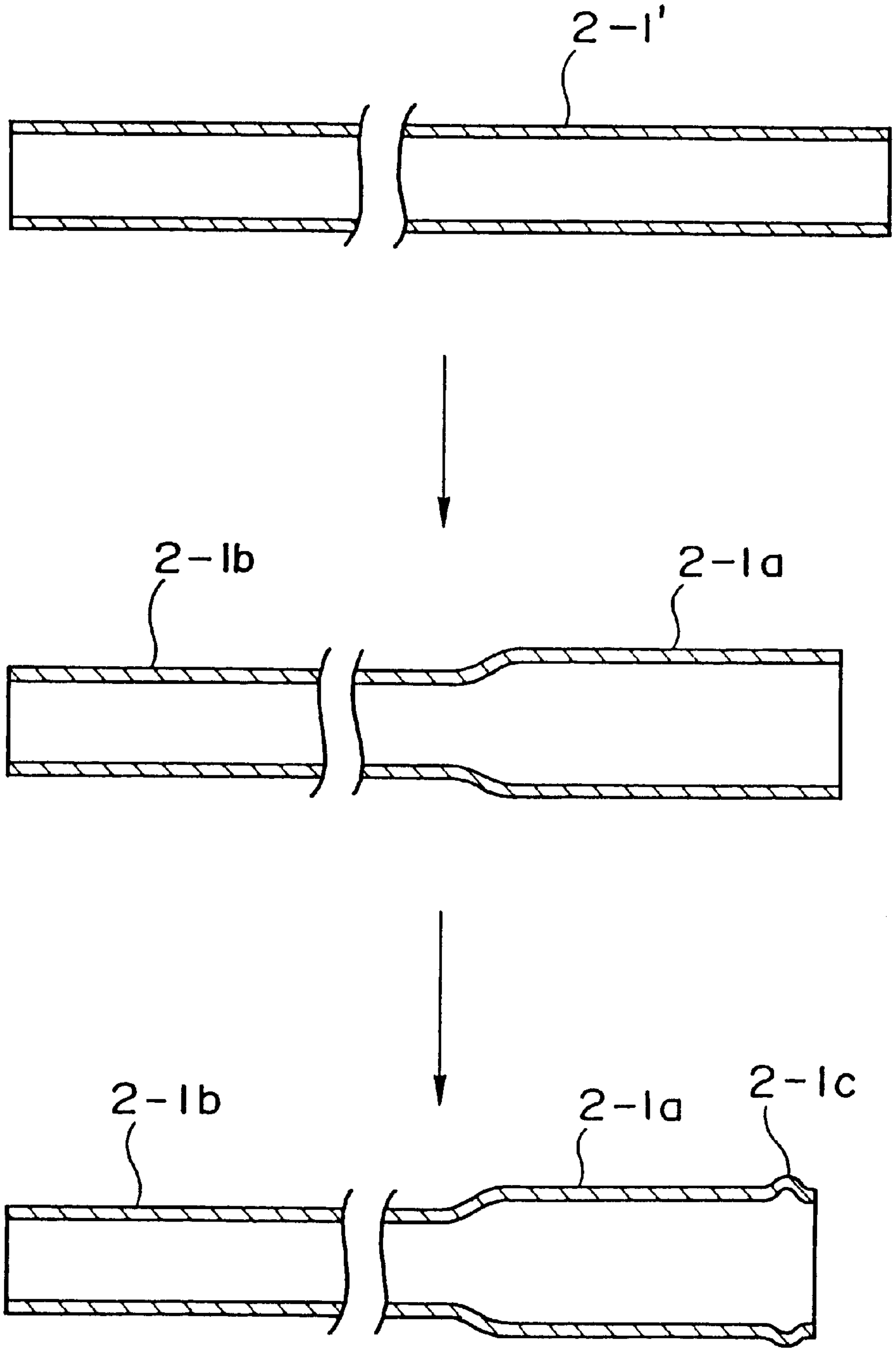
FIG. 2 is an explanatory view showing a shaping method of an outer pipe by a pipe expansion system as a shaping method of the outer pipe of the fuel injection pipe described above.
Figure 3:
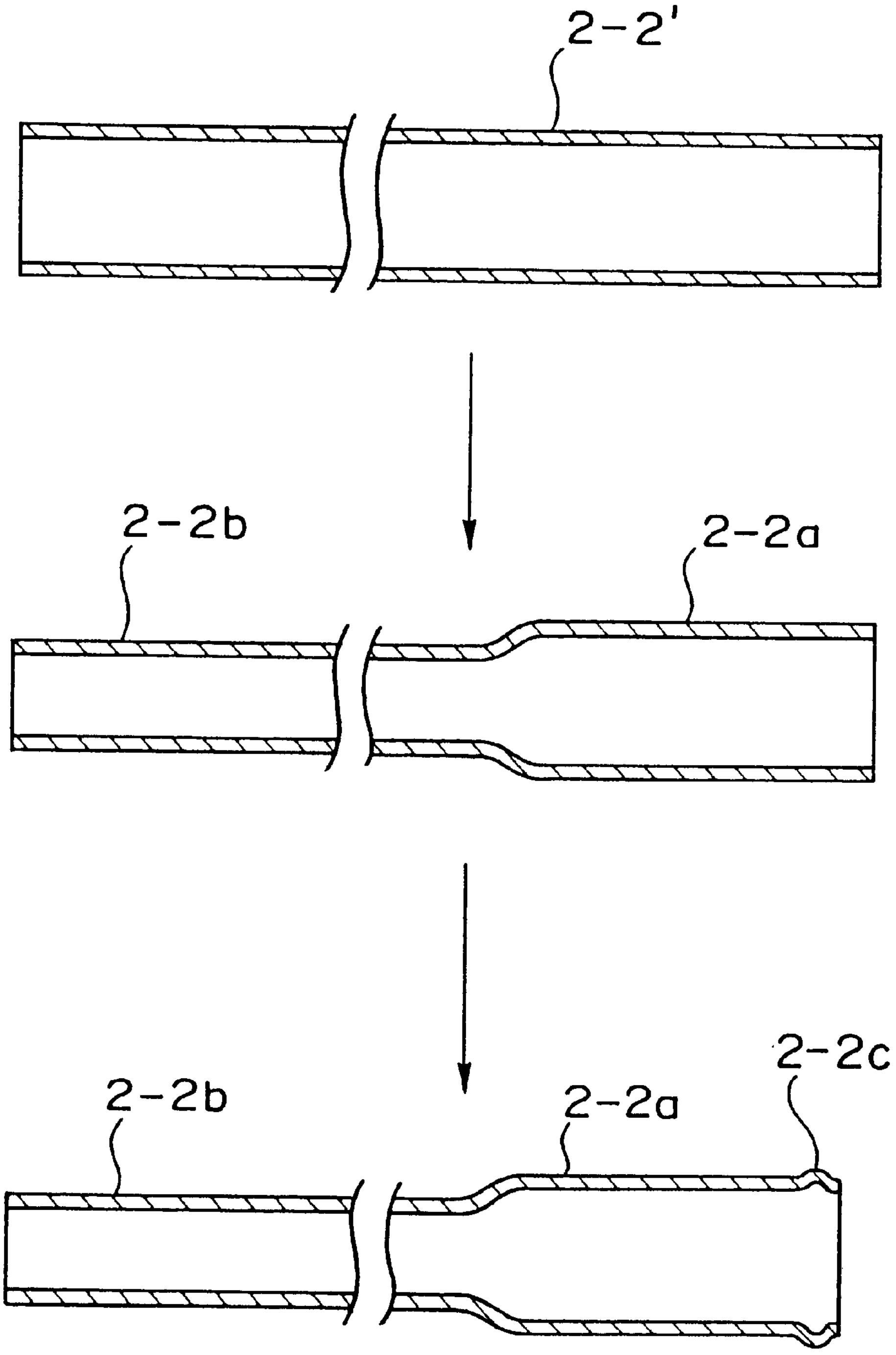
FIG. 3 is an explanatory view showing a shaping method of an outer pipe by a contraction system as another shaping method of the outer pipe of the fuel injection pipe described above.

Next, the shaping method of the outer pipe 2-1 having the interconnecting cylinder portion formed integrally will be explained with reference to FIGS. 2 and 3. In FIG. 2, one of the ends of a pipe 2-1' having a predetermined length and an inner diameter that is a little greater than the outer diameter of the injection pipe main body 1 is expanded by a pipe expanding machine to form a large diameter pipe portion 2-1*a* and a small diameter pipe portion 2-1*b*. A seal ring member fitting recess 2-1*c* is then formed by swelling it at an open end portion of the large diameter pipe portion 2-1*a*. According to the shaping method shown in FIG. 3, one of the ends of a pipe 2-2' having a predetermined length and the same diameter as that of the large diameter pipe portion of the outer pipe shown in FIG. 2 is contracted to form a small diameter pipe portion 2-2*b,* that has a diameter a little greater than the outer diameter of the injection pipe main body 1, and a large diameter pipe portion 2-2*a.* A seal ring member fitting recess 2-2*c* is then formed by expanding the open end portion of the large diameter pipe portion 2-2*a.* The type of the pipe expanding machine includes a mechanical pipe expansion system and a hydraulic pipe expansion system. Swelling work can be carried out by a press system that uses a die and a punch.

The washers 5*a* and 5*b* and the fastening unit 3-1 or 3-2 are equipped with drain holes 5*c* and 3-2*a* to recover the fuel in the event that the fuel leaks from the seat surface of the connection head portions 1-1 and 1-2 or from the injection main body 1.

Figure 4:
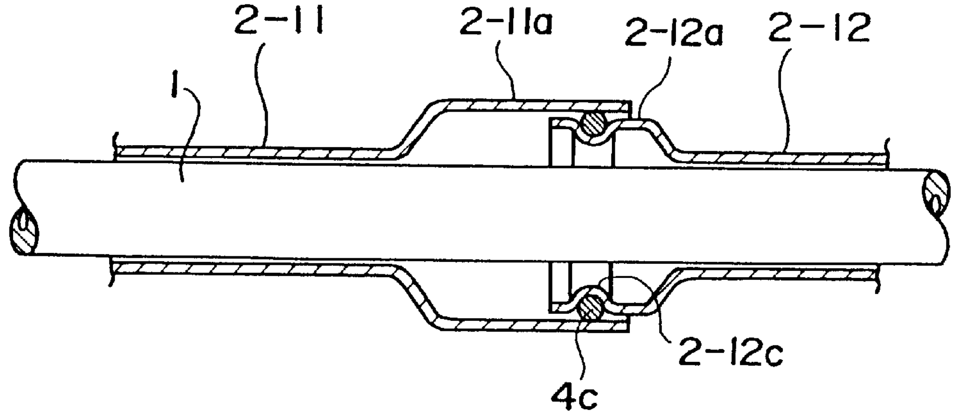
FIG. 4 is a partly enlarged, longitudinal sectional view showing in enlargement an outer pipe according to another embodiment of the present invention.
Figure 5:
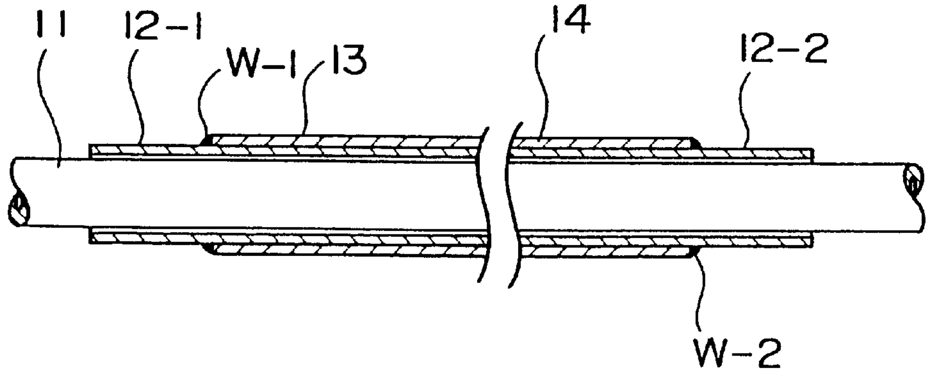
Fig. 5 PRIOR ART
FIG. 5 is a partly omitted, enlarged longitudinal sectional view of a outer pipe of a high-pressure fuel injection pipe for a Diesel engine according to the prior art and a bridging portion of an interconnecting cylinder portion, as an object of the present invention.

The embodiment described above applies pipe expansion work or contraction work to only one 2-1 of the outer pipes and uses a straight pipe for the other outer pipe 2-2. However, the present invention can use another construction shown in FIG. 4. Namely, pipe expansion work or contraction work is applied to both outer pipes to obtain outer pipes 2-11 and 2-12 having the large pipe diameter portions 2-11*a* and 2-12*a*, respectively. A seal ring member fitting recess 2-12*c* is formed in the outer diameter pipe portion 2-12*a* of the other outer pipe 2-12. The seal ring member 4*c* is fitted into this recess 2-12*c* and is then brought into pressure contact with the inner peripheral surface of the large diameter pipe portion 2-11*a* of one 2-11 of the outer pipes.

As described above, the high-pressure fuel injection pipe for a Diesel engine according to the present invention eliminates the interconnecting cylinder body, that has been necessary in the past, but employs the outer pipes. Therefore, the present invention does not require a thermal welding process step such as brazing and can therefore facilitate and quicken the assembly work. Thus, the present invention can eliminate the occurrence of cracks resulting from deterioration of the mechanical strength due to heating and can completely prevent the scatter and leak of the fuel from the cracks. Because the outer pipes each comprising a discrete body need not be superposed and fitted in such a manner as to be capable of moving in the axial direction, the present invention can completely eliminate deviation of the outer pipes from the normal positions, can secure high seal performance, and is therefore extremely useful.

What is claimed is:

1. A high-pressure fuel injection pipe for a diesel engine comprising:

a unitary fuel pipe main body having opposed first and second ends and enlarged first and second connection heads formed respectively at said first and second ends;

a first fastening nut mounted over said first connection head of said fuel pipe main body;

a second fastening nut mounted over said second connection head of said fuel pipe main body;

a unitary first outer pipe surrounding portions of the fuel pipe main body, said first outer pipe having a first end mounted to the first fastening nut and a second end projecting toward the second end of the fuel pipe main body;

a unitary second outer pipe surrounding portions of said fuel pipe main body, said second outer pipe having a second end mounted to the second fastening nut and a first end projecting toward said first end of said fuel pipe main body, said first end of second outer pipe being circumferentially expanded and being telescoped over said second end of said first outer pipe; and a seal ring disposed between the first outer pipe and the circumferentially expanded portion of the second outer pipe that is telescoped over the first outer pipe.

2. The high-pressure fuel injection pipe of claim 1, wherein the fuel pipe main body has an outside diameter and wherein the first and second outer pipes have inside diameters, the inside diameters of the first and second outer pipes being greater than the outside diameter of the fuel pipe main body.

3. The high-pressure fuel injection pipe of claim 1, wherein a portion of the second outer pipe in proximity to the first end thereof includes an inwardly facing annular sealing ring recess facing a portion of said first outer pipe, said sealing ring member trapped in said recess for sealed connection between said outer pipes.

4. The high-pressure fuel injection pipe of claim 1, wherein the first outer pipe is circumferentially expanded at the second end thereof, the circumferentially expanded portion of the first pipe being further formed to include an annular outwardly facing seal ring recess that faces portions of said second outer pipe adjacent the first end thereof, said seal ring being fitted in said recess of said first outer pipe for providing a sealed connection between said first and second outer pipes.

5. The high-pressure fuel injection pipe of claim 1, wherein the first end of the first outer pipe is surrounded by a portion of said first fastening nut, and wherein the second end of the second outer pipe is surrounded by the mounting portion of the second fastening nut.

6. The high-pressure fuel injection pipe of claim 5, further comprising fastening nut sealing rings between the first and second outer pipes the surrounding portions of said first and second fastening nuts for sealed connection of said first and second outer pipes to said first and second fastening nuts respectively.

* * * * *